United States Patent [19]

Muller et al.

[11] 4,139,674

[45] Feb. 13, 1979

[54] NOVEL TRANSPARENT POLYURETHANE POLYUREAS FOR LAMINATION OF GLAZING MATERIALS

[75] Inventors: Hanns P. Müller, Leverkusen; Wolfgang Oberkirch, Cologne; Kuno Wagner; Bernd Quiring, both of Leverkusen, all of Fed. Rep. of Germany

[73] Assignee: Bayer Aktiengesellschaft, Leverkusen, Fed. Rep. of Germany

[21] Appl. No.: 833,311

[22] Filed: Sep. 14, 1977

[30] Foreign Application Priority Data

Oct. 1, 1976 [DE] Fed. Rep. of Germany ....... 2644434

[51] Int. Cl.² .................. B32B 27/40; C08G 18/32; C09J 5/04; B29D 7/02
[52] U.S. Cl. ................................. 428/339; 156/331; 264/204; 428/424; 428/425; 528/64; 528/65
[58] Field of Search ................ 260/75 NH, 77.5 AM; 428/425, 339, 424; 528/64

[56] References Cited

U.S. PATENT DOCUMENTS

| | | |
|---|---|---|
| 3,412,054 | 11/1968 | Milligan et al. .................. 260/18 |
| 3,640,924 | 2/1972 | Hermann et al. ................. 260/13 |
| 3,658,939 | 4/1972 | Carpenter et al. ............... 260/858 |
| 3,835,081 | 9/1974 | Remley ....................... 260/29.2 TN |
| 4,048,001 | 9/1977 | Remley ........................... 156/331 |

*Primary Examiner*—H.S. Cockeram
*Attorney, Agent, or Firm*—Gene Harsh; Lawrence S. Pope; Frederick H. Colen

[57] ABSTRACT

The present disclosure is concerned with a novel transparent polyurethane polyurea which is particularly suitable for lamination to glass and glasslike transparent plastics. The polymer is the reaction product of high molecular weight diols, optionally low molecular weight diols, dihydroxy carboxylic acids, diisocyanates with only aliphatically and cycloaliphatically bound isocyanates and organic diamines having aliphatically and cycloaliphatically bound primary amino groups. It has specified contents of carboxyl groups and urea groups, and it has a minimum shear modulus at both 20 and 60° C.

The present disclosure is also concerned with a process for synthesizing such polymers. A preferred method is to react the diisocyanate and hydroxyl bearing compounds to prepare an isocyanate terminated prepolymer and chain extend with the diamine.

Also discussed are the production of film from these polymers by extrusion and solution casting, the production of laminates with glass and glasslike plastics and the laminates so produced. The solution cast or extruded films can be laminated to these substrates by the application of heat and pressure.

7 Claims, No Drawings

NOVEL TRANSPARENT POLYURETHANE POLYUREAS FOR LAMINATION OF GLAZING MATERIALS

FIELD OF THE INVENTION

This invention relates to new polyurethane polyureas, to a process for their production and to their use in the production of glass-clear laminates, especially laminated safety glass.

BACKGROUND OF THE INVENTION

Laminated safety glass is widely used in motor vehicle windscreens, as bullet-proof glass, for example for protecting bank and post office counters, and as window glass, for example for reducing the danger of injury in the event of breakage and also, for example, as a safeguard against burglary and theft.

The interlayers used in these laminated glasses have to satisfy numerous, very stringent requirements. The following properties, in particular, are of considerable importance, especially for the use of laminated glass in motor vehicles:

1. A high energy-absorbing capacity in the event of sudden stressing as encountered on impact with blunt, but also sharp-edged bodies.
2. Adequate glass adhesion which is intended to prevent the glass from shattering to any significant extent and causing injuries in the form of cuts in the event of accidents.
3. High translucency; no hazing or clouding should occur.
4. A high degree of light stability, in other words the windscreens should not turn yellow, even after prolonged exposure to sunlight.
5. High edge stability so that, when stored before fitting, the windscreens should not undergo any delamination from the edges through the absorption of water.

These properties in general and those mentioned under (1) and (2) in particular should be retained over as wide as possible a temperature range in which these materials are used.

In modified form, these requirements also apply to the use of the interlayers in armoured glass and in safety glass of the type used in building construction. Armoured glass is above all required to be bullet proof to a large extent. This makes it necessary to use an extremely tough interlayer.

Polyurethane interlayers for laminated safety glass are already known. Thus, according to German Offenlegungsschrift No. 2,302,400 (corresponding to U.S. Pat. Nos. 3,823,060 and 3,900,446), polyurethane interlayers for laminated safety glass are produced from 4,4'-methylene-bis-(cyclohexylisocyanate), a polyester containing terminal hydroxyl groups and having a melting point above 42° C., and a molecular weight of from 500 to 4,000, being the condensation product of a dicarboxylic acid and a diol compound, and a chain extender which is an aliphatic or alicyclic diol containing from 2 to 16 carbon atoms.

Unfortunately, conventional polyurethanes have the serious disadvantage of poor adhesion to glass. However, glass-plastics laminates are intended to be of a structure such that no splinters of glass can be released from the plastics interlayer of the laminated glass in the event of a collision. This requirement is not satisfied by conventional polyurethanes (cf. Example 7).

Accordingly, the object of the present invention is to obviate the above-mentioned serious disadvantage of conventional polyurethanes and, in addition, to provide polyurethane polyaddition products of the type which, in addition to excellent adhesion to glass, show outstanding impact strength over a wide temperature range, are free from hazing and local swellings, do not discolor on exposure to sunlight and show excellent edge stability with respect to penetrating water.

This object is achieved by the polyurethane polyureas provided by the invention.

SUMMARY OF THE INVENTION

Accordingly, the present invention relates to new polyurethane polyureas having a predominantly linear molecular structure and exclusively containing aliphatically or cycloaliphatically bound urethane and urea segments with a shear modulus G' (DIN 53445) which amounts to between 2 and 140 N/mm² at 20° C. and which does not fall below 1 N/mm² at 60° C., characterized by (a) a content of urea groups —NH—CO—NH— amounting to between about 1 and 20% by weight and
(b) a content of lateral carboxyl groups —COOH directly attached to the main chain of the molecule amounting to between about 0.001 and 10% by weight.

The invention also relates to a process for producing these polyurethane polyureas by reacting on excess quantity of an organic diisocyanate containing aliphatically and/or cycloaliphatically bound isocyanate groups with a dihydroxy polyester and/or dihydroxy polyether having a molecular weight in the range from about 300 to 6,000, an aliphatic dihydroxy monocarboxylic acid and, optionally, an aliphatic or cycloaliphatic dihydric alcohol having a molecular weight in the range from about 62 to 300, to form the corresponding isocyanate prepolymer containing two terminal isocyanate groups, followed by reaction of this isocyanate prepolymer with an organic diamine containing aliphatically and/or cycloaliphatically bound primary amino groups and having a molecular weight in the range from about 60 to 3,000, monofunctional synthesis components optionally being used in small quantities for adjusting the particular molecular weight required, wherein (a) the dihydroxy carboxylic acid used corresponds to the formula

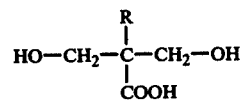

in which R represents hydrogen or an alkyl radical with 1 to 4 carbon atoms, the quantity in which this dihydroxy carboxylic acid is used being such that the polyurethane polyurea obtained contains from 0.001 to 10% by weight of lateral carboxyl groups, and (b) the quantitative ratios between diisocyanates, dihydroxyl compounds and diamines are selected so that the polyurethane polyurea contains from 1 to 20% by weight of urea groups —NH—CO—NH—.

Finally, the invention also relates to a process for producing laminates, wherein sheets of silicate glass and/or transparent plastics are coated and/or bonded together with the new polyurethane polyureas.

DETAILED DESCRIPTION OF THE INVENTION

The new polyurethane polyureas are non-yellowing, translucent clear thermoplasts with excellent edge stability and impact strength. Because of the presence in them of from about 1 to 20% by weight, preferably from about 2 to 10% by weight, of urea groups —NH—CO—NH— incorporated in the chain, and of from about 0.001 to 10% by weight, preferably from about 0.008 to 6% by weight, of lateral carboxyl groups —COOH directly attached to the chain of the macromolecule, the new polyurethane polyureas show excellent adhesion to glass and/or transparent glass-like plastics, such as for example polymethyl methacrylate, polycarbonate or cellulose esters, and are therefore eminently suitable for the production of laminated safety glass, the expression "laminated safety glass" as used in the context of the invention applying both to sheets of silicate glass or glass-like plastics coated on one or both sides with the polyurethane polyureas according to the invention, and also to composite materials which consist of at least two sheets of silicate glass and/or glass-like plastics bonded together with the polyurethane polyureas according to the invention and which may additionally be coated on one or both surfaces with the polyurethane polyureas according to the invention.

Production of the polyurethane polyureas according to the invention by the process according to the invention is preferably carried out on the prepolymer principle, i.e. by reacting an excess quantity of a suitable diisocyanate with dihydroxyl compounds to form the corresponding prepolymers containing terminal isocyanate groups, and subsequently chain-extending these prepolymers with diamine chain extenders. Monofunctional reactants may optionally be used in small quantities in order to regulate molecular weight and, hence, to adjust the physical properties of the polymer. In general, the type of synthesis components used and the quantitative ratios in which they are used are selected in such a way as to give a theoretical molecular weight of from about 10,000 to ∞, preferably from about 20,000 to 200,000. The difunctional synthesis components are generally used in such quantities in the production of the polyurethane polyureas according to the invention that from about 1.1 to 4 and preferably from about 1.2 to 3 isocyanate groups and from about 0.1 to 3, preferably from about 0.2 to 2, amino groups of the chain extender are used per hydroxyl group of the alcoholic synthesis component.

Diisocyanates suitable for use in the production of the polyurethane polyureas according to the invention are, in particular, diisocyanates containing aliphatically and/or cycloaliphatically bound isocyanate groups corresponding to the formula Q(NCO)$_2$, in which Q represents an aliphatic hydrocarbon radical with 2 to 12 carbon atoms or a cycloaliphatic or mixed aliphatic-cycloaliphatic hydrocarbon radical with 4 to 15 carbon atoms. Examples of diisocyanates such as these are ethylene diisocyanate, tetramethylene diisocyanate, hexamethylene diisocyanate, dodecamethylene diisocyanate, cyclobutane-1,3-diisocyanate, cyclohexane-1,3- and -1,4-diisocyanate or 1-isocyanato-3,3,5-trimethyl-5-isocyanatomethyl cyclohexane and mixtures of these diisocyanates. Cycloaliphatic or mixed aliphatic-cycloaliphatic diisocyanates are preferably used in the process according to the invention. 1-Isocyanato-3,3,5-trimethyl-5-isocyanatomethyl cyclohexane (isophorone diisocyanate) is particularly preferred.

The alcoholic synthesis components are
(a) the relatively high molecular weight diols known per se from polyurethane chemistry having molecular weights in the range from about 300 to 6,000, preferably from about 800 to 3,000,
(b) dihydroxy carboxylic acids corresponding to the formula

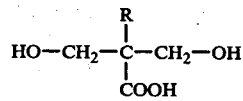

in which R represents hydrogen or an alkyl radical with 1 to 4 carbon atoms and, optionally,
(c) low molecular weight aliphatic or cycloaliphatic diols preferably having molecular weights in the range from about 62 to 300.

The quantitative ratios between the individual components (a), (b) and (c) which may be simultaneously or successively reacted with the isocyanate component, are preferably selected so that, for every hydroxyl group of component (a), there are from 0.01 to 12 hydroxyl groups of component (b) and from 0 to 10 hydroxyl groups of component (c).

Component (a) may be any of the polyester, polyether, polythioether, polyacetal or polyester amide diols known per se. The polyester or polyether diols known per se in polyurethane chemistry are preferably used.

The polyesters containing hydroxyl groups suitable for use in accordance with the invention are, for example, the reaction products of dihydric alcohols with dibasic carboxylic acids. Instead of using the free dicarboxylic acids, it is also possible to use the corresponding acid anhydrides or corresponding dicarboxylic acid esters with lower alcohols or mixtures thereof for producing the polyesters. The dicarboxylic acids may be aliphatic, cycloaliphatic and/or aromatic and may be substituted, for example by halogen atoms, and/or unsaturated. Examples of dicarboxylic acids such as these are succinic acid, adipic acid, suberic acid, azelaic acid, sebacic acid, phthalic acid, isophthalic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, terephthalic acid dimethyl ester and terephthalic acid-bis-glycol ester. Suitable dihydric alcohols are, for example, ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, 3-methyl-1,5-pentane diol, also diethylene glycol, triethylene glycol, tetraethylene glycol, polyethylene glycols, dipropylene glycol, polypropylene glycols, dibutylene glycol and polybutylene glycols. Polyesters of lactones, for example ε-caprolactone or hydroxy carboxylic acid, for example ω-hydroxy caproic acid, may also be used.

Particularly suitable dihydroxy polyesters are also the dihydroxy polycarbonates known per se which may be obtained, for example, by reacting diols, such as 1,3-propane diol, 1,4-butane diol and/or 1,6-hexane diol, 3-methyl-1,5-pentane diol, diethylene glycol, triethylene glycol, tetraethylene glycol, with diaryl carbonates, for example diphenyl carbonate or phosgene.

Suitable dihydroxy polyethers are also those known per se and are obtained, for example, by polymerizing epoxides, such as ethylene oxide, propylene oxide, butylene oxide, tetrahydrofuran, styrene oxide or epichlorohydrin, on their own, for example in the presence of boron trifluoride, or by adding these epoxides, either in admixture or successively, with starter components containing reactive hydrogen atoms, such as alcohols or amines, for example water, ethylene glycol, 1,3- or 1,2-propylene glycol, 4,4'-dihydroxy diphenyl propane, aniline. In many cases, it is preferred to use polyethers predominantly containing primary hydroxyl groups, in particular up to 90% by weight, based on all the hydroxyl groups present in the polyether.

Component (b) is a dihydroxy carboxylic acid corresponding to the above formula, such as for example dimethylol acetic acid, $\alpha,\alpha$-dimethylol propionic acid or $\alpha,\alpha$-dimethylol-n-valeric acid. It is preferred to use $\alpha,\alpha$-dimethylol propionic acid.

Component (c) is a glycol of the type already mentioned by way of example in the description of the polyesters.

Suitable diamine chain extenders are aliphatic, cycloaliphatic or mixed aliphatic-cycloaliphatic diamines preferably containing primary amino groups and having molecular weights in the range from about 60 to 300.

Examples are ethylene diamine, tetramethylene diamine, hexamethylene diamine, 4,4'-diaminodicyclohexyl methane, 1,4-diaminocyclohexane, 4,4'-diamino-3,3'-dimethyl dicyclohexyl methane or 1-amino-3,3,5-trimethyl-5-aminomethyl cyclohexane (isophorone diamine). It is particularly preferred to use 4,4'-diaminodicyclohexyl methane or the last of the abovementioned diamines, isophorone diamine.

As already mentioned, the theoretical molecular weight of the polyurethane polyureas according to the invention should amount to between about 10,000 and ∞ and preferably to between about 20,000 and 200,000. This resus may be achieved both by using a small excess of difunctional isocyanate-reactive chain extenders or even by using small quantities of monofunctional reactants. These monofunctional reactants are generally used in quantities of up to about 3% by weight and preferably in quantities of from 0.1 to 1% by weight, based on the total quantity of the synthesis components. The following are mentioned as examples of monofunctional reactants: monoisocyanates, such as methyl isocyanate, cyclohexyl isocyanate, phenyl isocyanate; mono alcohols, such as methanol, ethanol, butanol, tert.-butanol, octanol, isopropanol, cyclohexanol; mono-amines, such as methylamine, butylamine, dibutylamine.

In the case of the isocyanates and alcohols, the monofunctional synthesis components may actually be used during the production of the isocyanate-prepolymers while, in the case of the amines, they may be used during the chain-extending reaction. A possible variant for controlling molecular weight by using monofunctional synthesis components is, for example, to react isocyanate-prepolymers produced from difunctional synthesis components with a small deficit of diamine chain extenders in the presence of monohydric alcohols, such as isopropanol for example, the isocyanate groups initially reacting with the more reactive diamine until it has completely disappeared, after which the residual isocyanate groups are subjected to a chain-terminating reaction with the isopropanol used as solvent.

In the production of the polyurethane-polyureas according to the invention, the isocyanate-prepolymers are generally produced at a reaction temperature of from about 80° to 150° C. The end point of the reaction is determined by isocyanate group titration. Formation of the prepolymers is followed by the chain-extending reaction with the diamine chain extender either in the melt or even in solution.

Suitable solvents are, for example, methylene chloride, methanol or isopropanol. The chain-extending reaction may also be carried out with particular advantage in heated reaction screw extruders. In general, a temperature of from about 120° C. to 300° C., preferably from about 150° C. to 250° C., is maintained during the chain-extending reaction. Preferably the polyurethane-polyureas are prepared in a twin-screw extruder according to the process disclosed in U.S. Pat. No. 3,963,679.

In addition, the type of synthesis components used and the quantitative ratios in which they are used are selected within the ranges quoted above in such a way that the urea content and the content of lateral carboxyl groups in the polyurethane polyureas correspond to the values quoted above, and in such a way that the shear modulus G', as determined in the oscillating torsion test according to DIN 53445, amounts to between about 2 and 140 N/mm$^2$ at 20° C. and does not fall below a value of about 1 N/mm$^2$ at 60° C.

For example, the joint use of cycloaliphatic or branched aliphatic synthesis components, for example neopentyl glycol, as component c) produces an increase in the shear modulus.

In general, the polyurethane-polyureas according to the invention comply with the above-mentioned conditions regarding the shear modulus G' simply because of their content of urea groups —NH—CO—NH— essential to the invention, because any increase in the concentration of urea is accompanied by an increase in the shear modulus.

In the production of the polyurethane polyureas according to the invention, it is also possible in principle to incorporate other lateral polar groups such as, for example —SO$_3$H, —CN, —COOR, —CONH$_2$, —CONRH or —CONR$_2$ (R = C$_1$–C$_4$-alkyl) in addition to the lateral carboxyl groups essential to the invention in order to improve the adhesion of the polyurethane polyureas to the glasses. However, since the adhesion of the polyurethane polyureas according to the invention to the glasses is in itself excellent without this additional incorporation of polar lateral groups, this incorporation of additional polar groups is not essential.

In the process according to the invention for producing laminated safety glass, the polyurethane polyureas according to the invention are used in the form of films ranging, for example, from about 0.1 to 5 mm in thickness. These films may be produced by conventional film extrusion techniques or by casting solutions of the polyurethane polyureas according to the invention in suitable solvents, for example of the type mentioned by way of example above, onto polished metal surfaces in casting machines and evaporating the solvent. In this way, the polyurethane polyurea films according to the invention can be obtained in the necessary layer thicknesses by repeated casting. Basically, it is also possible directly to produce the film on a sheet of glass used for the production of the laminated safety glasses by casting of a solution and physically drying the coated film obtained. The films may also be obtained by extrusion techniques known per se.

In the production of the laminated safety glasses in accordance with the invention, the polyurethane polyureas according to the invention are used as coating agents and/or as binders for sheets of glass and/or sheets of glass-like plastics.

Any type of silicate-containing glass of the type used for the production of safety glasses may be used in the process according to the invention for producing laminated safety glass. Glasses obtainable by the float process are preferably used.

In addition to the silicate-containing glasses known per se, synthetic "glasses" especially transparent polycarbonate films or sheets (cf. for example U.S. Pat. No. 3,028,365 and U.S. Pat. No. 3,117,019) or transparent films or sheets of polymerized methacrylic acid methyl ester, may also be used in the process according to the invention for the production of laminated safety glass. Sheets or films of cellulose esters are also suitable. The thickness of the sheets of glass used in the process according to the invention for producing the laminated safety glass is not a critical parameter and is generally between about 0.1 and 10 mm. However, it is also possible to use glass films with a thickness of only 100 $\mu$m or sheets of glass with a thickness of 20 mm.

The bond between the sheet of glass and the polyurethane polyurea according to the invention in the production of coated glasses or the bond between two or more sheets of glass using the polyurethane polyureas according to the invention as binder, is established in principle by melting the film of the polyurethane polyureas according to the invention, which generally have a melting point between about 60° and 180° C., after it has been applied to the surface of the sheet of glass to be coated or inserted between two sheets of glass. The production of composite glass by bonding several sheets of glass together with the polyurethane polyureas according to the invention is generally carried out at temperatures of from about 100° to 200° C., and under pressures of from about 5 to 20 bars.

The following advantages are afforded by the invention:
1. Glass-clear, highly transparent polyurethane polyurea films are produced by a process which is simple and economic in practice having the particular advantage over conventional films that they adhere strongly, for example to glass, and are therefore particularly suitable for the production of laminated safety glass.
2. Composite glass panels containing the interlayer films according to the invention are particularly superior in regard to their behavior under impact both at elevated temperatures and at low temperatures such as are frequently encountered in panels exposed to weathering.

Thus, panels produced in accordance with Example 3 using films according to Example 2.1 of a polyurethane polyurea according to Example 1 remain intact in the dropped ball test according to DIN 52306 when the ball is dropped from a height of 5 meters at + 35° C., and from a height of 5.50 meters at a temperature of −20° C. This substantially corresponds to the performance of a panel containing a standard polyvinyl butyral interlayer at room temperature. In the above-mentioned test, the maximum dropping height withstood by the last of the above-mentioned panels at +35° C. is approximately 4m. At −8° C., the dropping height withstood by these panels is only 2.50 meters. At −20° C., their impact strength would appear to be considerably lower.

The superiority of the film according to the invention is also apparent at room temperature. Dropping heights of 8 meters are still withstood by comparison with the maximum dropping height of 6 meters withstood by panels containing A PVB interlayer. However, the considerably better behavior at elevated temperatures and low temperatures is particularly valuable.

3. The polyurethane polyurea films according to the invention are free from discoloration, hazing or local swelling (cf. Examples 1, 5, 6, 9, 10, 11, 12) and do not undergo any changes on exposure to sunlight.

4. In contrast for example to the polyvinyl butyral films currently in use, the films according to the invention can be processed into composite glass in nonconditioned atmospheres (cf. Example 3). In conventional polyvinyl butyral films, the need to condition the films arises out of the dependence of their properties upon water content (cf. G. Rodloff, Neuere Untersuchungen an Verbund-Sicherheitsglas fur Windschutzscheiben (Recent Investigations Into Composite Safety Glass for Windscreens), Automobiltechnische Zeitschrift 64, No. 6, 1962).

5. The safety glasses produced from the films according to the invention show excellent edge stability (cf. Example 3).

The invention is illustrated by the following Examples in which all the percentages quoted are percent by weight.

EXAMPLES

EXAMPLE 1

Production of a polyurethane polyurea in the melt (A) In a stirrer-equipped vessel, 70 kg (31.2 mol) of a linear 1,4-butane diol polyadipate containing terminal hydroxyl groups and having an average molecular weight of approximately 2200 and 34.7 kg (156.3 mols) of 1-isocyanato-3-isocyanatomethyl-3,3,5-trimethyl cyclohexane (isophorone diisocyanate) are stirred overnight under nitrogen at a temperature of 60° C. Thereafter 7.5 kg (83.3 mols) of 1,4-butane diol and 1.4 kg (10.45 mols) of dimethylol propionic acid are added, followed by stirring for another 2 hours at 100° C. Thereafter a content of free isocyanate groups of 2.2% is found.

(B) 600 g (0.313 mol) per second of the isocyanate-prepolymer obtained in accordance with Example 1A and 26.6 g (0.313 mol) per second of isophorone diamine are continuously introduced through separate pipes into the feed hopper of a standard, heated twin-screw reaction extruder. The screws are fitted with feed and kneading elements. The length to diameter ratio of the screws amounts to about 40.

At a rotational speed of 200 min$^{-1}$, melt temperatures in the range from 120° to 200° C. are measured over the length of the machine. The product melt is quenched in a water bath, subsequently free from the water adhering to it with compressed air and granulated. The reaction product is obtained in the form of a colorless glass-clear resin.

—NH—CO—NH— content: 2.46% by weight
—COOH— content: 0.4% by weight
shear modulus G'
    at 20° C.: 56 N/mm$^2$
    at 60° C.: 1.7 N/mm$^2$ (as determined by the oscillating torsion test according to DIN 53445).

Production of composite glass panels with the polyurethane polyureas according to the invention as interlayer.

EXAMPLE 2

Film production:
2.1 Extrusion:

The polyurethane polyureas produced in accordance with Example 1 in a twin-screw reaction extruder are obtained in the form of a cylindrical granulate and can be extruded, for example through a flat-sheeting die, to form glass-clear films at a melt temperature of from 170° to 220° C.

2.2 Casting from solution:

The polyurethane polyureas according to the invention, in the form of solutions with a solids content of approximately 20%, are cast by suitable techniques (doctor, curtain), for example onto sheets of glass or onto a moving steel belt, and the solvent is removed either at room temperature or at elevated temperatures in a drying tunnel. In order to obtain bubble-free films in the required layer thicknesses of from 0.7 to 0.8 mm, it is of advantage to produce the films by repeatedly casting thin layers and evaporating off the solvent before the next casting.

Producing the films by casting is particularly appropriate for producing test specimens for determining the characteristics of the material. Extrusion would appear to be preferable for manufacturing the films on a commercial scale because it is the more economical method.

EXAMPLE 3

Production of the composite glass panels:

The polyurethane polyureas according to the invention, in the form of films from 0.6 to 0.8 mm thick, are inserted between two sheets of glass (silicate glass) measuring, for example, 30 × 30 cm, and introduced into a suitable autoclave. The autoclave is initially evacuated in order to remove the air between the glass and film. A preliminary bond is established by heating in vacuo to 80°–100° C., followed by venting. The temperature in the autoclave is then increased to 100°–190° C., preferably to 120°–170° C., depending upon the polyurethane-polyurea used, and the final bond established by pressing for 5 to 30 minutes, preferably for 10 to 20 minutes, under a nitrogen pressure of from 4 to 16 bars, preferably from 8 to 12 bars.

Composite glass panels produced in this way withstand the boiling test according to DIN 52308. Bubble formation in the peripheral zone is minimal.

EXAMPLE 4

Testing the bond strength of composite glass panels:

15 × 15 mm$^2$ samples are taken from the composite glass panels to be tested. The samples, whose surfaces were roughened, were bonded between two metal stamps with the same surface area (15 × 15 mm$^2$). A standard epoxide resin adhesive was used as the adhesive (Permabond-Contact-Cement No. 747, a product of Lubben and Co., Munich).

In a tensile tester, one of the stamps was suspended in the device connected to the dynamometer, while the other stamp was suspended in the separating device. The separation rate (V) amounted to 1 mm/minute. A recorder recorded the adhesion forces occurring during the tests. The adhesion forces were converted to a sample cross-section of 1 mm$^2$.

Bond strength determined by this method:
Example 5: 11.0 (N/mm$^2$)
Example 6: 11.6 (N/mm$^2$) for comparison
Example 7: 2.5 (N/mm$^2$)
Example 8: 3.5 (N/mm$^2$)

EXAMPLE 5

153 g (0.09 mol) of a polyester having a hydroxyl number of 65.9 synthesized from adipic acid, 1,6-hexane diol and neopentyl glycol, are dehydrated for 30 minutes at 120° C. in a water jet vacuum. Thereafter 1.34 g (0.01 mol) of dimethylol propionic acid are added to the melt, followed after thorough mixing by the addition of 66.6 g (0.3 mol) of isophorone diisocyanate (hereinafter referred to as IPDI). The whole was then stirred under nitrogen for 3 hours at 90° C. The isocyanate content of the prepolymer is then determined: isocyanate observed: 7.84%, isocyanate calculated: 7.61%.

600 g of methylene chloride are then added to the prepolymer. The mixture is then left to cool to room temperature while stirring in a nitrogen atmosphere, followed by the dropwise addition over a period of 30 minutes of a solution of 34 g (0.2 mol) of isophorone diamine (hereinafter referred to as IPDA) in 320 parts of methylene chloride and 80 parts of methanol. A clear, colorless film solution with a viscosity ($\eta$) of 26,800 mPas. is obtained. —NH—CO—NH— content of the solid: 9.1%, —COOH— content: 0.176%, shear modulus G' 106.0 N/mm$^2$ at 20° C., 34.9 N/mm$^2$ at 60° C.

EXAMPLE 6

180 g (0.09 mol) of a polyester having a hydroxyl number of 56 produced from adipic acid and ethylene glycol are mixed with 1.34 g (0.01 mol) of dimethylol propionic acid and dehydrated for 30 minutes at 120° C. in a water jet vacuum. Thereafter 66.6 g (0.3 mol) of IPDI are added all at once. The mixture is stirred under nitrogen for 30 minutes at 120° C. The isocyanate content of the prepolymer is then determined: isocyanate observed: 6.65%, isocyanate calculated: 6.78%.

600 g of toluene are then added to the prepolymer. The mixture is left to cool to room temperature while stirring in a nitrogen atmosphere, followed by the dropwise addition over a period of 30 minutes of a solution of 34 g (0.2 mol) of IPDA in 370 g of toluene and 410 g of isopropanol. Before the last 50 ml of this solution are added, a sample (IR-spectrum) is taken from the mixture. If only very little isocyanate can be detected by IR-spectroscopy, the chain-extending reaction is terminated. The residual chain extending agent is discarded. —NH—CO—NH— content of the solid: 8.23%, —COOH— content: 0.159%,
shear modulus G'
  62.0 N/mm$^2$ at 20° C.,
  32.0 N/mm$^2$ at 60° C.

COMPARISON EXAMPLE 7 (without dimethylol propionic acid)

200 g (0.1 mol) of the polyester of Example 6 are dehydrated for 30 minutes at 120° C. in a water jet vacuum. 44.4 g (0.2 mol) of IPDI are then added all at once. The mixture is stirred under nitrogen for 30 minutes at 120° C. Thereafter the isocyanate-content of the prepolymer is determined. Isocyanate observed: 3.28%, isocyanate calculated: 3.44%.

600 g of toluene are then added to the prepolymer. The mixture is then left to cool to room temperature while stirring in a nitrogen atmosphere, followed by the dropwise addition over a period of 30 minutes of a solution of 17 g (0.1 mol) of IPDA in 370 g of toluene and 410 g of isopropanol. Before the last 50 ml of this solution are added, a sample (IR-spectrum) is taken from the mixture. If only very little isocyanate can be detected by IR-spectroscopy, the chain-extending reaction is terminated. The residual chain-extending agent is discarded.
—NH—CO—NH— content of the solid: 4.44%
—COOH— content: 0%
shear modulus G'
    5.5 N/mm$^2$ at 20° C.
    2.0 N/mm$^2$ at 60° C.

COMPARISON EXAMPLE 8 (without dimethylol propionic acid)

170 g (0.1 mol) of the polyester of Example 5 are dehydrated for 30 minutes at 120° C. in a water jet vacuum. 44.4 g (0.2 mol) of IPDI are then added all at once. The mixture is stirred under nitrogen for 30 minutes at 120° C. The isocyanate-content of the prepolymer is then determined. Isocyanate observed: 3.98%, isocyanate calculated: 3.93%.

600 g of toluene are then added to the prepolymer. The mixture is left to cool to room temperature while stirring in a nitrogen atmosphere, followed by the dropwise addition over a period of 30 minutes of a solution of 17 g (0.1 mol) of IPDA in 210 g of toluene and 340 g of isopropanol. Before the last 50 ml of this solution are added, a sample (IR-spectrum) is taken from the mixture. If only very little isocyanate can be determined by IR-spectroscopy, the chain-extending reaction is terminated. The residual chain-extending agent is discarded.
—NH—CO—NH— content of the solid: 5.01%
—COOH— content: 0%
shear modulus G'
    7.6 N/mm$^2$ at 20° C.
    2.7 N/mm$^2$ at 60° C.

From the polyurethane polyurea solutions (according to Examples 7 and 8), films are produced by casting in accordance with 2.2 and composite glass panels are produced in accordance with 3. Composite glass panels produced in this way show poor adhesion to glass (cf. adhesion test, Example 4).

EXAMPLE 9

336 g (0.15 mol) of a polyester (having a hydroxyl number of 50 produced from adipic acid and 1,4-butane diol are dehydrated for 30 minutes at 120° C./15 Torr. 36 g (0.4 mol) of 1,4-butane diol and 6.7 g (0.05 mol) of dimethyl propionic acid are introduced into the melt, followed after thorough mixing by the addition of 166.5 g (0.75 mol) of IPDI. The melt is stirred under nitrogen for 40 minutes at 120° C. The isocyanate content of the prepolymer is then determined.
Isocyanate observed: 2.1%, isocyanate calculated: 2.3%.

300 g of toluene are then added to the prepolymer. The mixture is then left to cool to room temperature while stirring in a nitrogen atmosphere, followed by the dropwise addition over a period of 30 minutes of a solution of 25.2 g (0.12 mol) of 4,4'-diaminodicyclohexyl methane in 891 g of toluene and 510 g of isopropanol. Thereafter only very little isocyanate can be detected by IR-spectroscopy.
—NH—CO—NH— content of the solid: 2.44%
—COOH— content: 0.39%
shear modulus G'
    38.0 N/mm$^2$ at 20° C.
    1.6 N/mm$^2$ at 60° C.

EXAMPLE 10

336 g (0.15 mol) of a polyester (having a hydroxyl number of 50 produced from adipic acid and butane diol are dehydrated for 30 minutes at 120° C./15 Torr. 40.5 g (0.45 mol) of 1,4-butane diol, 0.134 g (0.001 mol) of dimethylol propionic acid and 166.4 g (0.75 mol) of IPDI are then added to the melt. The mixture is stirred under nitrogen for 90 minutes at 120° C. The isocyanate-content of the prepolymer is then determined. Isocyanate observed: 2.12%, isocyanate calculated: 2.32%. 300 g of toluene are then added to the prepolymer. The mixture is left to cool to room temperature, followed by the dropwise addition over a period of 30 minutes of a solution of 20.4 g (0.12 mol) of IPDA in 891 g of toluene and 510 g of isopropanol. On completion of the addition, only very little isocyanate can be detected by IR-spectroscopy.
—NH—CO—NH— content of the solid: 2.47%
—COOH— content: 0.008%
shear modulus G'
    42.0 N/mm$^2$ at 20° C.
    1.8 N/mm$^2$ at 60° C.

EXAMPLE 11

1900 g (0.95 mol) of a propylene glycol-started polyether, in which propylene oxide has been polyadded in the presence of sodium alcoholate up to a hydroxyl number of 56 (functionality 2), and 6.7 g (0.05 mol) of dimethylol propionic acid are mixed and dehydrated for 30 minutes at 100° C./20 Torr. 0.5 g of dibutyl tin dilaurate (as catalyst) and 666 g (3 mols) of IPDI are added to the mixture, followed by stirring under nitrogen for 30 minutes at 100° C. Thereafter the isocyanate-content amounts to 6.4% (isocyanate calculated: 6.53%). 6100 g of toluene are added to the melt and the mixture is left to cool to room temperature. A solution of 332.5 g (1.96 mol) of IPDA in 2620 g of isopropanol is then added dropwise to the mixture over a period of 30 minutes. A clear low-viscosity solution is obtained.
—NH—CO—NH— content of the solids: 7.82%
—COOH— content: 0.077%
shear modulus G'
    7.5 N/mm$^2$ at 20° C.
    4.6 N/mm$^2$ at 60° C.

EXAMPLE 12

200 g (0.1 mol) of a polyester having a hydroxyl number of 56 of adipic acid and ethylene glycol are mixed with 55.26 g (0.09 mol) of a propylene glycol-started polyether having a hydroxyl number of 183, in which first propylene oxide and then ethylene oxide have been polyadded in the presence of sodium methylate, and with 1.34 g (0.01 mol) of dimethylol propionic acid, followed by dehydration for 30 minutes at 120° C./15 Torr. 88.8 g (0.4 mol) of IPDI are then added to the mixture all at once, after which the mixture is stirred under nitrogen for 2 hours. The isocyanate-content then amounts to 4.85% (isocyanate calculated: 4.9). 700 g of toluene are then introduced into the melt which is then left to cool to room temperature, followed by the dropwise addition of 34 g (0.2 mol) of IPDA dissolved in 97 g of toluene and 342 g of isopropanol. A clear highly viscous solution is obtained.

—NH—CO—NH— content of the solid: 6.11%
—COOH— content: 0.118%
shear modulus G'
　　55.0 N/mm$^2$ at 20° C.
　　9.8 N/mm$^2$ at 60° C.

EXAMPLE 13

Two 30 × 30 cm polycarbonate panels with a thickness of 4 mm and a 0.8 mm thick film of the polyurethane polyurea of Example 1 (PUR) are preheated for 30 minutes to 80°-90° C. The film is then placed between the two polycarbonate panels and the system exposed for a few minutes to a pressure of around 40 bars (for example in a multidaylight press) in order to remove as much as possible of the air between the panels and film. A pre-laminate is formed and may be handled without the individual layers becoming separated from one another. The prelaminate is then introduced into an autoclave which is heated to 140° C. The autoclave is left at this temperature for 30 minutes under a nitrogen pressure of 15 bars and then cooled under pressure. (This procedure substantially corresponds to the conditions normally applied in the production of conventional composite glass). It is best to keep the laminate between supporting panels of glass or metal during its production in order to prevent possible deformation of the polycarbonate panels at the processing temperature. An extremely tough glass-clear laminate is obtained. The adhesion between polycarbonate and polymethane is extremely strong. It may be additionally varied by suitably selecting the lamination temperature.

EXAMPLE 14

The procedure is as in Example 13, except that a multilayer laminate of three 4 mm thick polycarbonate panels is built up by the process described in that Example, a 2.5 mm thick layer of a polyurethane polyurea according to the invention being inserted between two polycarbonate panels. A transparent laminate is again obtained. This laminate is bullet proof under fire with 6 mm ammunition.

EXAMPLE 15

Polycarbonate-PUR-glass composite

A 0.8 mm thick film of the polyurethane polyurea of Example 1 according to the invention is placed on a 30 × 30 cm large 2.8 mm thick plate of glass, followed by the application of a 3 mm thick polycarbonate plate. The procedure is then as in Example 3, the prelaminate being produced by heating in vacuo at 80° C. The prelaminate is then kept under a pressure of 15 bars for 30 minutes at a temperature of 140° C. It is then cooled under pressure. A glass clear laminate free from air bubbles is obtained. Although the glass breaks under impact (for example with a hammer or thrown stone), it does not become separated from the polycarbonate. Laminates of polycarbonate and glass produced with the polyurethane polyureas according to the invention are extremely stable to light. They do not yellow, even after prolonged exposure to sunlight.

EXAMPLE 16

The procedure is as in Example 15, except that a 200 μm thick glass film is used instead of a glass plate. In another variant of this Example, a structure of glass film/PUR film/polycarbonate panel/PUR film is used, again with glass film as the outer layer. The laminates formed are characterized by extreme toughness of the polycarbonate and PUR layer and by the surface quality (hardness, scratch resistance) of the glass.

EXAMPLE 17

Following the procedure of Example 13, a composite structure of two 4 mm thick panels of polymethyl methacrylate (PMMA) (for example Plexiglas ®) with a 0.8 mm thick polyurethane interlayer is produced in an autoclave at 130° C./15 bars. The glass clear laminate is tougher than a compact PMMA panel of comparable thickness.

EXAMPLE 18

5 layers of a 0.8 mm thick film of the polyurethane polyurea of Example 1 are placed on a 50 × 20 cm large, 10 mm thick plate of glass, followed by the application of a 3 mm thick plate of glass. This assemblage is heated to 80°-90° C. and then passed through squeezing rollers for venting. The final laminate is then produced in the usual way, i.e. in an autoclave over a period of 30 to 45 minutes at 140°-145° C./15 bars. The transparent laminate thus produced withstands fire from a 0.4 mm magnum revolver at a range of 4 meters.

EXAMPLE 19

The procedure is as in Example 3, except that a plate of glass coated beforehand with release agent, for example a standard commercial-grade polysiloxane or fluorine polymer, is used for covering the PUR film on one side. After the laminate has been produced, this plate of glass can be lifted off. A two-layer laminate of glass and the film according to the invention is obtained. The advantage of laminates such as these is that, when the laminate is subjected to impact on the film side, virtually no injuries can be caused through cuts. The energy-absorbing capacity is not impaired by comparison with the laminates of Example 3.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is

1. Polyurethane polyureas with a predominantly linear molecular structure exclusively containing aliphatically or cycloaliphatically bound urethane and urea segments and having a shear modulus G' (DIN 53 445) which amounts to between 2 and 140 N/mm$^2$ at 20° C. and does not fall below a value of 1 N/mm$^2$ at 60° C., characterized by
　(a) a content of urea groups —NH—CO—NH— amounting to between 1 and 20% by weight and
　(b) a content of lateral carboxyl groups —COOH directly attached to the main chain of the molecule amounting to between 0.001 and 10% by weight.

2. A process for the production of the polyurethane polyureas claimed in claim 1 by reacting excess quantities of organic diisocyanates with aliphatically and/or cycloaliphatically bound isocyanate groups with dihydroxy polyesters and/or dihydroxy polyethers having a molecular weight in the range from 300 to 6000, aliphatic dihydroxy monocarboxylic acids and, optionally, aliphatic or cycloaliphatic dihydric alcohols with a molecular weight in the range from 62 to 300, to form the corresponding NCO-prepolymers containing two terminal isocyanate groups, followed by reaction of these NCO-prepolymers with organic diamines containing aliphatically and/or cycloaliphatically bound primary amino groups and having a molecular weight in the range from 60 to 300, monofunctional synthesis components optionally being used in small quantities for adjusting the particular molecular weight required, wherein (a) the dihydroxy carboxylic acid used corresponds to the formula

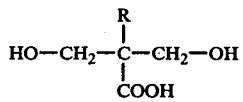

in which R represents hydrogen or an alkyl radical with 1 to 4 carbon atoms, the quantity in which this dihydroxy carboxylic acid is used being such that the polyurethane polyurea obtained contains from 0.001 to 10% by weight of lateral carboxyl groups, and (b) the quantitative ratio between diisocyanates, dihydroxyl compounds and diamines is selected in such a way that the polyurethane polyurea contains from 1 to 20% by weight of urea groups —NH—CO—NH.

3. A polyurethane polyurea comprising the reaction product of (a) dihydroxy compounds having molecular weights between about 300 and 6,000 selected from the group consisting of polyesters and polyethers, (b) dihydroxy carboxylic acids corresponding to the formula

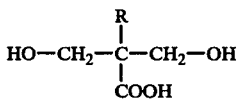

wherein R represents H, or a $C_1$ to $C_4$ alkyl radical, (c) optionally aliphatic or cycloaliphatic diols having molecular weights of between about 62 and 300, (d) diisocyanates having exclusively aliphatically and cycloaliphatically bound isocyanate groups, and (e) organic diamines containing aliphatically and cycloaliphatically bound primary amino groups and having molecular weights between about 60 and 3,000, wherein the equivalent ratio of d:(a+b+c) is between about 1.1:1 and 4:1, the equivalent ratio of e:(a+b+c) is between about 0.1:1 and 3:1, the molar ratio of a:b is between about 1:0.01 and 1:12, and the molar ratio of a:c is between about 1:0 and 1:10, said polyurethane polyurea having (1) a molecular weight greater than about 10,000, (2) a urea group content of between about 1 and 20 wt. %, and (3) a content of lateral carboxyl groups directly attached to the main chain of the molecule of between about 0.001 and 10 wt. %.

4. The polyurethane polyurea of claim 3 wherein (a) component a) comprises compounds having molecular weight of between about 800 and 3,000, (b) the diisocyanates are of the formula $Q(NCO)_2$ wherein Q represents an aliphatic hydrocarbon radical of 2 to 12 carbon atoms or a cycloaliphatic hydrocarbon radical of 4 to 15 carbon atoms, (c) the ratio of d:(a+b+c) is between about 1.2:1 and 3:1 and the ratio of e:(a+b+c) is between about 0.2:1 and 2:1, (d) said polyurethane polyurea has (1) a molecular weight between about 20,000 and 200,000, (2) a urea group content of between about 2 and 10 wt. %, and (3) a content of carboxyl groups directly attached to the main chain of the molecule of between about 0.008 and 6 wt. %.

5. A polyurethane polyurea comprising the reaction product of (a) a dihydroxy polyester or polyether having a molecular weight of between about 800 and 3,000, (b) α,α-dimethylol propionic acid, (c) optionally aliphatic or cycloaliphatic diols having molecular weights of between about 62 and 300, (d) 1-isocyanato-3,3,5-trimethyl-5-isocyanatomethyl cyclohexane, and (e) diamines selected from 4,4'-diamino dicyclohexyl methane and 1-amino-3,3,5-trimethyl-5-amino methyl cyclohexane, wherein the NCO to OH ratio is between 1.2:1 and 3:1 and the amino to OH ratio is between 0.2:1 and 2:1, said polyurethane polyurea having (1) a molecular weight between about 20,000 and 200,000, (2) a urea group content of between 2 and 10 wt. %, and (3) a content of carboxyl groups directly attached to the main chain of the molecule of between about 0.008 and 6 wt. %.

6. A transparent film 0.1 to 5 mm in thickness formed from the polyurethane polyurea of claim 3.

7. A process for the production of transparent polyurethane polyureas comprising (a) reacting at between about 80° and 150° C.

(1) dihydroxy polyesters or polyethers having molecular weights of between about 300 and 6,000, (2) dihydroxy carboxylic acids of the formula

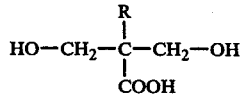

wherein R represents H or $C_{1-4}$ alkyl, and (3) optionally aliphatic or cycloaliphatic diols having molecular weights of between about 62 and 300, with (4) diisocyanates having exclusively aliphatically and cycloaliphaticaly bound isocyanate groups at an NCO to OH ratio of between about 1.1:1 and 4:1, and (b) chain extending the prepolymer produced by extrusion at between about 120° and 300° C. with organic diamines containing aliphatically and cycloaliphatically bound primary amino groups and having molecular weights between about 60 and 3000.

* * * * *